(12) United States Patent
Matsuura

(10) Patent No.: US 10,089,731 B2
(45) Date of Patent: Oct. 2, 2018

(54) IMAGE PROCESSING DEVICE TO REDUCE AN INFLUENCE OF REFLECTED LIGHT FOR CAPTURING AND PROCESSING IMAGES

(71) Applicant: Yoshio Matsuura, Aichi (JP)

(72) Inventor: Yoshio Matsuura, Aichi (JP)

(73) Assignee: OMRON AUTOMOTIVE ELECTRONICS CO., LTD., Aichi (JP)

( * ) Notice: Subject to any disclaimer, the term of this patent is extended or adjusted under 35 U.S.C. 154(b) by 7 days.

(21) Appl. No.: 15/381,774

(22) Filed: Dec. 16, 2016

(65) Prior Publication Data
US 2017/0178304 A1    Jun. 22, 2017

(30) Foreign Application Priority Data

Dec. 16, 2015    (JP) ................. 2015-245118

(51) Int. Cl.
*G06T 5/20*    (2006.01)
*G06K 9/00*    (2006.01)
(Continued)

(52) U.S. Cl.
CPC ............ *G06T 5/20* (2013.01); *G06K 9/00255* (2013.01); *G06K 9/00845* (2013.01); *G06K 9/2036* (2013.01); *G06T 5/008* (2013.01); *H04N 5/2256* (2013.01); *H04N 5/2351* (2013.01); *H04N 5/23229* (2013.01); *H04N 5/332* (2013.01); *G06T 2207/10012* (2013.01); *G06T 2207/20021* (2013.01); *G06T 2207/30201* (2013.01);
(Continued)

(58) Field of Classification Search
CPC .................................................. G06K 9/00255
See application file for complete search history.

(56) References Cited

U.S. PATENT DOCUMENTS 4,287,410 A * 9/1981 Crane .................... A61B 3/113
250/201.4
5,185,671 A * 2/1993 Lieberman ........... H04N 5/2351
348/229.1
(Continued)

FOREIGN PATENT DOCUMENTS

JP    2006-048328 A    2/2006
JP    2008-123137 A    5/2008

*Primary Examiner* — Cynthia Segura
(74) *Attorney, Agent, or Firm* — Osha Liang LLP

(57) ABSTRACT

An image processing device includes: first and second illumination units that emit light to a subject in different directions; an image capturing unit that captures first and second images in a state where the first and second illumination units emit the light, respectively; and an image correction unit that compares a first luminance value of a first pixel configuring the first image with a second luminance value of a second pixel configuring the second image for each corresponding pixel, and generates a corrected image by performing correction processing to a synthesized image of the first and second images. The image correction unit calculates a difference between the first and second luminance values, and calculates a luminance correcting value based on the difference and a function which monotonically increases as the difference increases and whose increase rate gradually decreases, and generates the corrected image using the luminance correcting value.

7 Claims, 16 Drawing Sheets

(51) Int. Cl.
*H04N 5/225* (2006.01)
*H04N 5/235* (2006.01)
*G06K 9/20* (2006.01)
*G06T 5/00* (2006.01)
*H04N 5/232* (2006.01)
*H04N 5/33* (2006.01)

(52) U.S. Cl.
CPC .............. *G06T 2207/30268* (2013.01); *H04N 2209/047* (2013.01)

(56) References Cited

U.S. PATENT DOCUMENTS

| | | | |
|---|---|---|---|
| 7,777,897 B1* | 8/2010 | Gibbons | G01B 11/303 356/237.1 |
| 8,350,903 B2 | 1/2013 | Fujimoto et al. | |
| 8,485,826 B2* | 7/2013 | Harada | A61B 5/161 434/236 |
| 2006/0028492 A1* | 2/2006 | Yamaguchi | G06F 3/14 345/690 |
| 2006/0087582 A1* | 4/2006 | Scharenbroch | G06K 9/00604 348/370 |
| 2008/0084499 A1* | 4/2008 | Kisacanin | A61B 3/113 348/370 |
| 2008/0100858 A1* | 5/2008 | Kondo | G06T 5/008 358/1.9 |
| 2010/0123781 A1* | 5/2010 | Shimura | H04N 5/2354 348/164 |
| 2010/0265548 A1* | 10/2010 | Yamaguchi | H04N 1/4053 358/3.05 |
| 2010/0310166 A1* | 12/2010 | Moriya | G06T 5/003 382/167 |
| 2012/0133891 A1* | 5/2012 | Jiang | H04N 5/3535 351/210 |
| 2013/0022170 A1* | 1/2013 | Cho | A61B 6/482 378/62 |
| 2015/0228061 A1* | 8/2015 | Shin | G06T 3/4015 382/167 |
| 2015/0381890 A1* | 12/2015 | Povlick | H04N 5/23229 348/241 |
| 2016/0089011 A1* | 3/2016 | Shiraishi | A61B 1/0638 348/71 |
| 2016/0324505 A1* | 11/2016 | Maeda | A61B 8/0858 |
| 2017/0249721 A1* | 8/2017 | Hirai | G06T 5/001 |

* cited by examiner

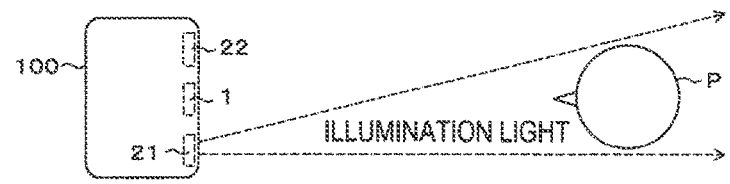
FIG. 4A
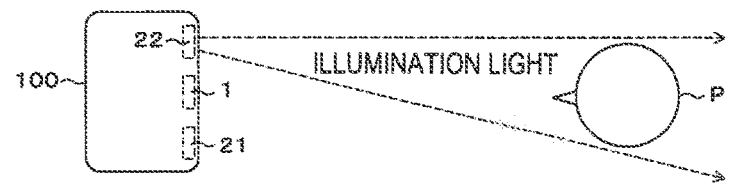
FIG. 4B
FIG. 5A
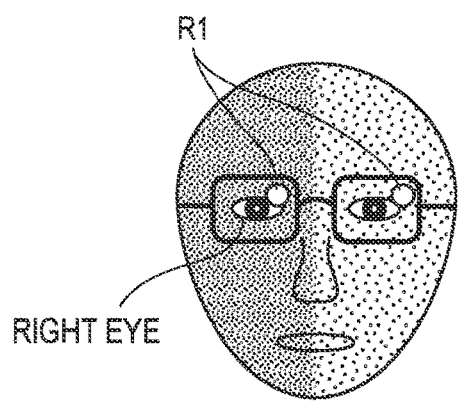
STATE WHERE FIRST
ILLUMINATION UNIT EMITS LIGHT
FIG. 5B
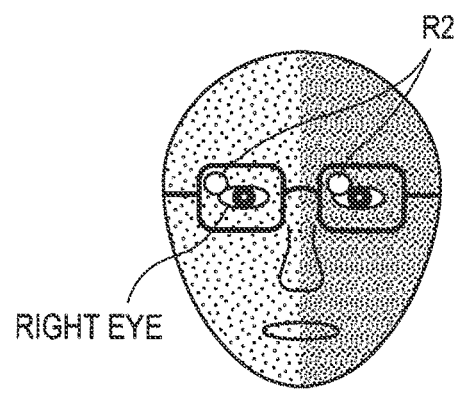
STATE WHERE SECOND
ILLUMINATION UNIT EMITS LIGHT FIRST IMAGE
(IMAGE OF RIGHT EYE PORTION WHEN
FIRST ILLUMINATION UNIT EMITS LIGHT)

SECOND IMAGE
(IMAGE OF RIGHT EYE PORTION WHEN
SECOND ILLUMINATION UNIT EMITS LIGHT)

SYNTHESIZED IMAGE ACCORDING
TO METHOD OF RELATED ART

SYNTHESIZED IMAGE ACCORDING
TO PRESENT EMBODIMENT

FACE IMAGE ACCORDING
TO METHOD OF RELATED ART

FACE IMAGE ACCORDING
TO PRESENT EMBODIMENT

HIGH LUMINANCE VALUE: Max (Q1, Q2)

DIFFERENCE LOGARITHMIC VALUE A = $\log_2$|FIRST LUMINANCE VALUE Q1 − SECOND LUMINANCE VALUE Q2|
LUMINANCE AVERAGE VALUE B = (Q1 + Q2) / 2
LOW LUMINANCE VALUE: Min (Q1, Q2)
CORRECTED LUMINANCE VALUE Qs' = $\alpha \cdot$ (Min (Q1, Q2) + A) + $\beta \cdot$ B
                              = $\alpha \cdot$ (Min (Q1, Q2) + A) + (1 − $\alpha$) $\cdot$ B

FACE IMAGE OF CASE WHERE
LIGHT IS REFLECTED
FROM GLASSES

FACE IMAGE OF CASE WHERE
LIGHT IS NOT REFLECTED
FROM GLASSES

IMAGE PROCESSING DEVICE TO REDUCE AN INFLUENCE OF REFLECTED LIGHT FOR CAPTURING AND PROCESSING IMAGES

CROSS-REFERENCES TO RELATED APPLICATIONS

This application is based upon and claims the benefit of priority from Japanese Patent Application No. 2015-245118, filed on Dec. 16, 2015; the entire contents of which are incorporated herein by reference.

FIELD

One or more embodiments of the present invention relate to an image processing device which captures images of a subject and processes the images, and particularly, to a technology of reducing influence of reflected light from eyeglasses or the like.

BACKGROUND

There is a vehicle in which a device (hereinafter, referred to as a "driver monitor") for monitoring inattentive driving or drowsy driving of a driver is mounted. The driver monitor detects an eye of the driver from a face image of the driver which is captured by a camera, and detects a direction of a line of sight of a pupil, a closing state of an eyelid, or the like. However, if the driver is wearing eyeglasses, illumination light in the vehicle, external light, illumination light for capturing an image, or the like is reflected from a lens or a frame of the eyeglasses, and thereby, it is impossible to accurately detect a pupil or an eyelid. Particularly, in a case where reflected light from the eyeglasses overlaps the pupil, detection accuracy decreases remarkably. In order to solve this problem, technologies disclosed in JP-A-2008-123137 and JP-A-2006-48328 are known.

In JP-A-2008-123137, two illumination devices are provided in a camera for a vehicle. The camera for a vehicle alternately lights the two illumination devices in synchronization with imaging timing, and captures images of a subject to which one of the illumination devices emits light and to which the other illumination device emits light. Then, luminances of each pixel of the captured two images are compared with each other, the pixels having the same relative position, a pixel with the lower luminance is extracted, and one synthesized image is generated. Thereby, unexpected reflection of light from the eyeglasses is reduced, and the eye is easily detected.

In JP-A-2006-48328, it is determined whether or not luminance values of each pixel of an image are larger than a threshold value when detecting a face from the image which is captured by a camera. Then, in a case where a high luminance portion which is configured by pixels with a luminance value larger than the threshold value is detected, the luminance value of each pixel of the high luminance portion is set to low luminance, and thus, the high luminance portion is converted into a low luminance portion. Thereby, the high luminance portion caused by the reflected light from the eyeglasses is removed, and thus, the eye is easily detected.

However, in a case where a right side of a face of a subject is irradiated with light and the face is captured, luminance of a left side of the face is lower than luminance of the right side of the face, and thus, an image of the left side of the face is darker. Meanwhile, in a case where the left side of the face of the subject is irradiated with light and the face is captured, the luminance of the right side of the face is lower than the luminance of the left side of the face, and thus, an image of the right side of the face is darker. Hence, as disclosed in JP-A-2008-123137, if a synthesized image is generated by using pixels with the smaller luminance value of two images, the entire image becomes dark. Accordingly, there is a possibility that it is hard to accurately detect an outline of a face image or to accurately detect a pupil or an eyelid from the face image.

In contrast to this, in the technology of JP-A-2006-48328, it is possible to prevent the entire image from becoming dark, but a high luminance portion is converted into a low luminance portion, and thus, there is a possibility that a white portion of an eye becomes dark. In addition, since a bright portion is converted into a dark portion using a threshold value as a boundary, brightness becomes discontinuous at the converted portion and a non-converted portion adjacent thereto, therefore, an image is unnatural. In addition, as disclosed in JP-A-2006-48328, a method of removing a high luminance portion based on the threshold value includes branched processing in an algorithm of image processing, and thus, there is a problem that arithmetic processing is complicated.

SUMMARY

An object of one or more embodiments of the present invention is to provide an image processing device which can make the entire image not become dark and can reduce influence of reflected light from eyeglasses or the like. Another object of one or more embodiments of the present invention is to provide an image processing device which obtains a natural and continuous image using simple arithmetic processing.

An image processing device according to one or more embodiments of the present invention includes a first illumination unit that emits illumination light to a subject; a second illumination unit that emits illumination light to the subject in a direction different from the first illumination unit; an image capturing unit that captures a first image of the subject in a state where the first illumination unit emits the illumination light to the subject, and captures a second image of the subject in a state where the second illumination unit emits the illumination light to the subject; and an image correction unit that compares a first luminance value of a first pixel configuring the first image with a second luminance value of a second pixel configuring the second image for each corresponding pixel, and generates a corrected image by performing predetermined correction processing to a synthesized image of the first image and the second image, based on the comparison results. The image correction unit calculates a difference between the first luminance value and the second luminance value, and calculates a luminance correcting value based on the difference and a predetermined function which monotonically increases together with an increase of the difference and whose increase rate gradually decreases, and generates the corrected image using the luminance correcting value.

With this configuration, in a case where light is reflected from eyeglasses or the like of the subject and the difference between the first luminance value and the second luminance value is large, the difference is compressed by a function whose increase rate gradually decreases, and thus, it is possible to generate a correction image which is rarely affected by reflected light by reflecting the relatively small difference into the luminance correcting value. Meanwhile, in a case where light is not reflected from the eyeglasses or the like of the subject and the difference between the first luminance value and the second luminance value is small, a degree of compression of the difference by a function is small, and thus, it is possible to make the entire image become bright by reflecting the difference into the luminance correcting value. In addition, correction is made by only single arithmetic which is performed by a function without using a threshold value, and thus, an image is continuous and arithmetic processing is also simple.

In one or more embodiments of the present invention, one illumination unit and two image capturing units may be provided instead of providing two illumination units and one image capturing unit. In this case, the image processing device includes an illumination unit that emits illumination light to a subject; a first image capturing unit that captures a first image of the subject in a state where the illumination unit emits the illumination light to the subject; and a second image capturing unit that captures a second image of the subject in a direction different from the first image capturing unit in a state where the illumination unit emits the illumination light to the subject.

In one or more embodiments of the present invention, a logarithmic function can be used as the function. In this case, the image correction unit calculates a difference logarithmic value that is a logarithm of an absolute value of the difference between the luminance values, based on the logarithmic function, and calculates the luminance correcting value using the difference logarithmic value.

In one or more embodiments of the present invention, the luminance correcting value may be a first luminance correcting value obtained by adding a low luminance value, which is a smaller luminance value of the first luminance value and the second luminance value, to the difference logarithmic value.

In one or more embodiments of the present invention, the luminance correcting value may be a second luminance correcting value obtained by adding a value, which is obtained by multiplying a value obtained by adding the low luminance value that is a smaller luminance value of the first luminance value and the second luminance value to the difference logarithmic value by a first coefficient $\alpha$, to a value obtained by multiplying an average value of the first luminance value and the second luminance value by the second coefficient $\beta$.

In one or more embodiments of the present invention, the first coefficient $\alpha$ may change in a range of $0 \leq \alpha \leq 1$ according to a high luminance value that is a larger luminance value of the first luminance value and the second luminance value, and may gradually decrease as the high luminance value decreases. The second coefficient $\beta$ may satisfy $\beta=1-\alpha$ ($0 \leq \beta \leq 1$), and may gradually increase as the high luminance value decreases. In this case, the image correction unit detects the high luminance value, and determines whether the high luminance value is larger than or equal to a predetermined value; sets the first coefficient $\alpha$ to 1 and sets the second coefficient $\beta$ to 0, and calculates the second luminance correcting value, in a case where the high luminance value is larger than or equal to a predetermined value; and calculates the second luminance correcting value by using the first coefficient $\alpha$ ($0 \leq \alpha < 1$) and the second coefficient $\beta$ ($0 < \beta \leq 1$) according to the high luminance value, in a case where the high luminance value is smaller than the predetermined value.

In one or more embodiments of the present invention, it is preferable that the logarithmic function uses 2 as a base so that arithmetic is simplified.

In one or more embodiments of the present invention, luminance values may be compared with each other by a block unit including a plurality of pixels, instead of comparing the first luminance value with the second luminance value for each corresponding pixel. In this case, the image correction unit compares the first luminance values of a plurality of first blocks, each of which includes a plurality of first pixels, with the second luminance values of a plurality of second blocks, each of which includes a plurality of second pixels, for each corresponding block.

According to one or more embodiments of the present invention, it is possible to provide an image processing device which can make the entire image not become dark and can reduce influence of reflected light from eyeglasses or the like; furthermore, obtains a natural and continuous image using simple arithmetic processing.

BRIEF DESCRIPTION OF THE DRAWINGS

FIGS. 4A and 4B are views in which a state where a subject is irradiated by the driver monitor is viewed from the top;

FIGS. 5A and 5B are views illustrating a face of the subject which is irradiated by the driver monitor;

DETAILED DESCRIPTION

Figure 1:
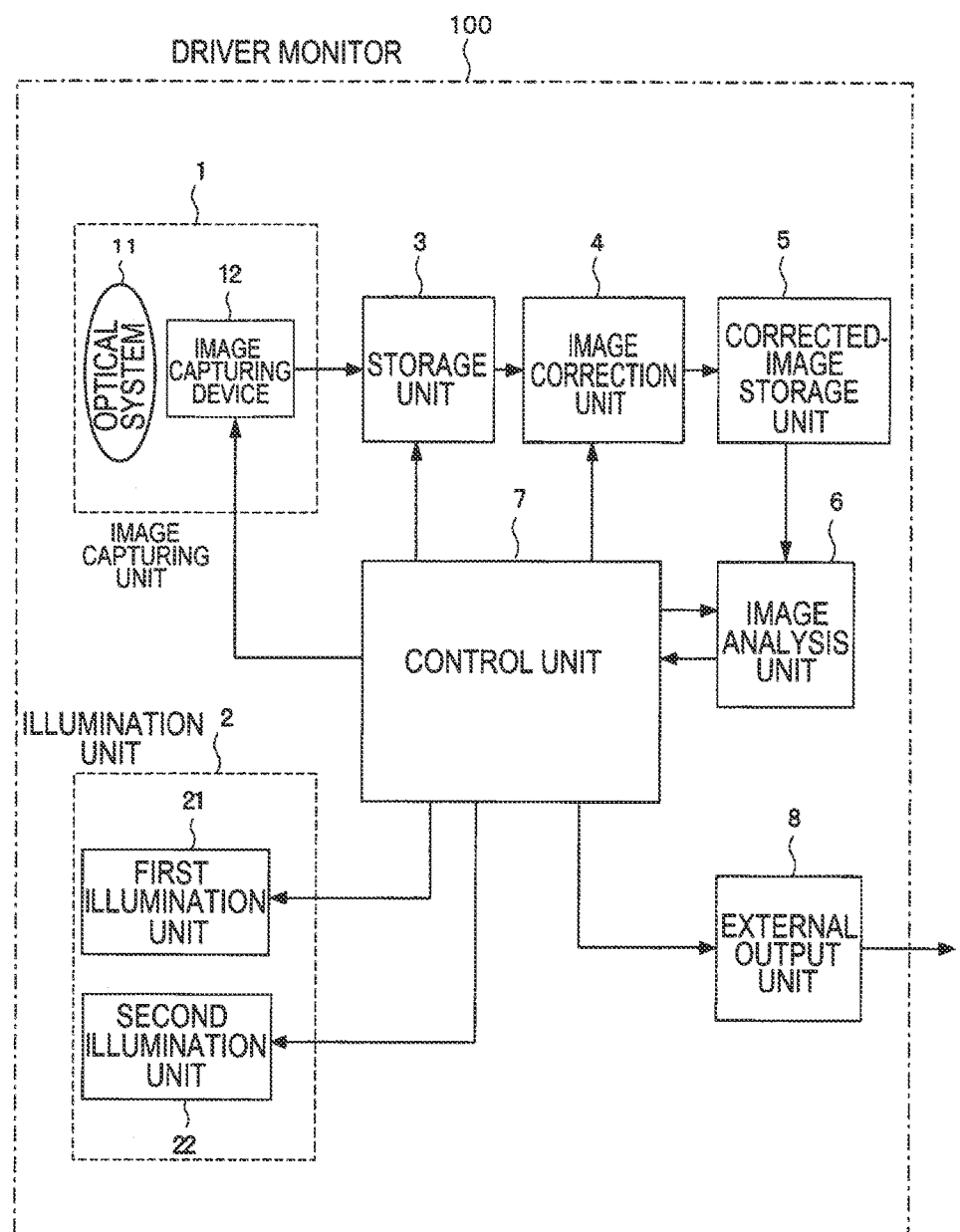
FIG. 1 is a block diagram of a driver monitor according to a first embodiment.

In embodiments of the invention, numerous specific details are set forth in order to provide a thorough understanding of the invention. However, it will be apparent to one of ordinary skill in the art that the invention may be practiced without these specific details. In other instances, well-known features have not been described in detail to avoid obscuring the invention.

Embodiments of the present invention will be described with reference to the drawings. The same symbols or reference numerals will be attached to the same portions or portions corresponding thereto in each figure. Hereinafter, a driver monitor which monitors inattentive driving or drowsy driving of a driver will be described as an example of an image processing device according to one embodiment of the invention.

First, a configuration of the driver monitor according to a first embodiment will be described with reference to FIG. 1 and FIG. 2. In FIG. 1, the driver monitor 100 is mounted in a vehicle and includes an image capturing unit 1, an illumination unit 2, a storage unit 3, an image correction unit 4, a corrected image storage unit 5, an image analysis unit 6, a control unit 7, and an external output unit 8, all of which. The image capturing unit 1 is a portion which configures a camera and is configured with an optical system 11 including lenses, an optical filter, and the like, and an image capturing device 12 which captures images of a subject (driver) through the optical system 11. The illumination unit 2 is a portion which configures a light source that emits light to the subject and is configured with a first illumination unit 21 and a second illumination unit 22.

The image capturing device 12 includes multiple image capturing elements (not illustrated) which are arranged in a lattice shape. Each image capturing element is configured with, for example, a charge coupled device (CCD). The first illumination unit 21 and the second illumination unit 22 respectively include multiple light emitting elements 21a (FIG. 2) and multiple light emitting elements 22a (FIG. 2) which are arranged in a lattice shape. Each of the light emitting elements 21a and 22a is configured with, for example, a light emitting diode (LED) which emits near-infrared light.

Figure 2:
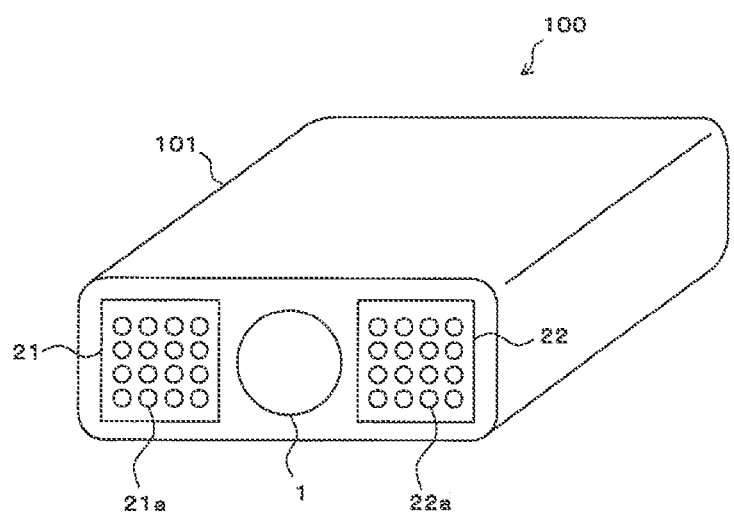
FIG. 2 is an external view of the driver monitor according to the first embodiment.

As illustrated in FIG. 2, the image capturing unit 1, the first illumination unit 21, and the second illumination unit 22 are provided so as to face the front surface of a case 101 of the driver monitor 100. The image capturing unit 1 is located at a central portion of the front surface of the case 101, and the two illumination units 21 and 22 are disposed on the right and the left so as to interpose the image capturing unit 1.

Figure 3:
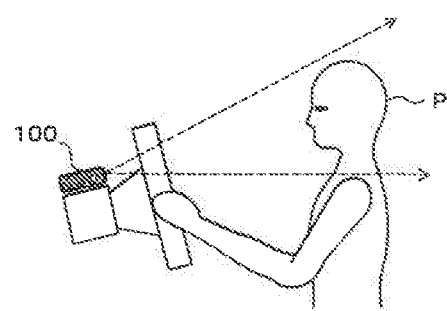
FIG. 3 is a view illustrating a using state of the driver monitor.

As illustrated in FIG. 3, the driver monitor 100 is provided at a driver's seat of a vehicle, and is provided at a position facing a face of a driver P that is a subject. In addition, the first illumination unit 21 of the driver monitor 100 emits light toward the right side of the face of the driver P, as illustrated in FIG. 4A. In addition, the second illumination unit 22 of the driver monitor 100 emits light toward the left side of the face of the driver P, as illustrated in FIG. 4B. That is, the second illumination unit 22 emits light toward the face of the driver P in a direction different from the first illumination unit 21.

In FIG. 1, in a state where the first illumination unit 21 emits illumination light to the driver P, the image capturing device 12 of the image capturing unit 1 captures an image of a face of the driver P. An image which is captured at this time is referred to as a "first image". In addition, in a state where the second illumination unit 22 emits illumination light to the driver P, the image capturing device 12 of the image capturing unit 1 captures an image of a face of the driver P. An image which is captured at this time is referred to as a "second image". The first illumination unit 21 and the second illumination unit 22 irradiate the face of the driver P with light at different timing, and the image capturing unit 1 captures images of the face of the driver P at different timing.

The storage unit 3 stores the first image and the second image which are captured by the image capturing unit 1. The image correction unit 4 performs predetermined correction processing for a synthesized image of the first image and the second image, and generates a correction image. The correction processing will be described below in detail. The corrected image storage unit 5 stores the correction image which is generated by the image correction unit 4. The image analysis unit 6 analyzes the correction image stored in the corrected image storage unit 5, and detects a position of an eye, a state of a pupil and an eyelid, or the like. The control unit 7 determines whether or not the driver P performs inattentive driving or drowsy driving, based on the detection results of the image analysis unit 6, and outputs the determination results. In detail, the control unit generates a signal indicating whether or not the driver performs the inattentive driving or the drowsy driving, and provides the generated signal to the external output unit 8. The external output unit 8 outputs the signal to a vehicle control system (not illustrated). In addition, the control unit 7 controls imaging timing of the image capturing unit 1 and lighting timings of the first illumination unit 21 and the second illumination unit 22, and performs predetermined control with respect to the storage unit 3, the image correction unit 4, and the image analysis unit 6.

FIGS. 5A and 5B schematically illustrate light and shade states of a face of a subject to which illumination light is applied. In the face which is irradiated by the first illumination unit 21 in FIG. 5A, the right side (left side in the figure) of the face is darker than the left side (right side in the figure) of the face because light is applied in a left direction when viewed from the subject. In addition, as denoted by a symbol R1, the illumination light from the first illumination unit 21 is reflected from lenses of the right and the left of eyeglasses. In the face which is irradiated by the second illumination unit 22 in FIG. 5B, the left side (right side in the figure) of the face is darker than the right side (left side in the figure) of the face because light is applied in a right direction when viewed from the subject. In addition, as denoted by a symbol R2, the illumination light from the second illumination unit 22 is reflected from lenses of the right and the left of eyeglasses.

Figure 8A:
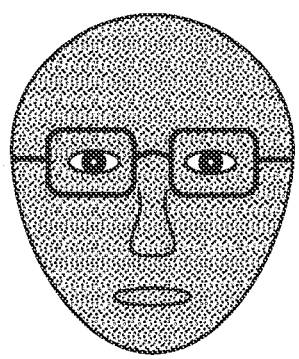
FIGS. 8A and 8B are views comparing a face image according to the first embodiment with a face image of the related art.

As described above, if the light is reflected from the lenses of the eyeglasses, it is hard to detect accurately a state of the eyes. Accordingly, in the related art, luminances of pixels having the same relative position in the respective images that are obtained by imaging the faces of FIGS. 5A and 5B are compared with each other, and a synthesized image is generated by using the pixels with low luminance (JP-A-2008-123137). However, when using this method, influence of reflected light from the lenses are reduced, but since the synthesized image is configured by pixels with low luminance, the entire image becomes dark as illustrated in FIG. 8A.

Figure 8B:
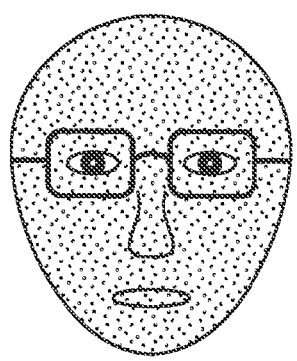

Hence, according to an embodiment of the invention, when the respective images that are obtained by imaging the faces of FIGS. 5A and 5B are synthesized, not only the pixels with low luminance are used, but also unique correction is further added thereto, and thus, it is possible to obtain a synthesized image brighter than that of the related art, as illustrated in FIG. 8B. Hereinafter, correction processing according to the embodiment of the invention will be made in detail.

FIGS. 6A to 6D are schematic diagrams illustrating captured images of a right eye portion (refer to FIGS. 5A and 5B) of the subject. In the figures, one square denotes one pixel. Here, for the sake of brief description, the number of pixels is much smaller than the number of actual pixels. The darker a color of the pixel is, the darker an image of the pixel is, and the lighter the color of the pixel is, the brighter the image of the pixel is.

Figure 6A:
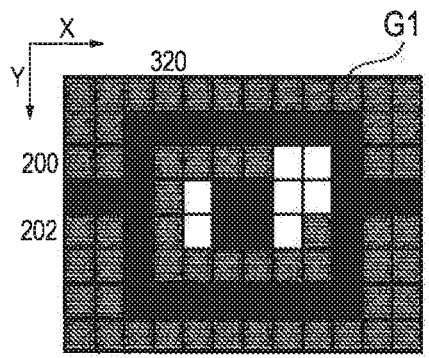
FIGS. 6A to 6D are schematic diagrams illustrating captured images of a right eye portion of the subject.

FIG. 6A is an image of a right eye portion which is captured in a state (FIG. 5A) where the illumination light is emitted from the first illumination unit 21. Hereinafter, the image is referred to as a "first image" and a pixel G1 which configures the first image is referred to as a "first pixel". In this state, illuminance on the right side of the face is insufficient, and thus, most of the first pixel G1 has low luminance. Accordingly, the first image is dark over all, but a portion corresponding to a reflection portion R1 (FIG. 5A) from which the illumination light is reflected in the eyeglasses becomes a remarkably bright image, as shown in white pixels.

Figure 6B:
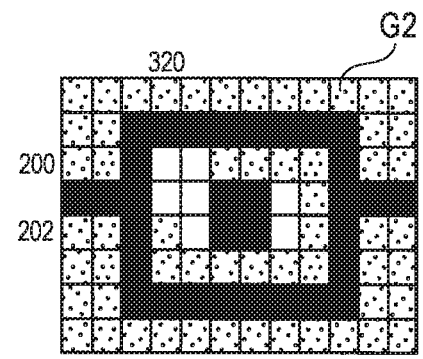

FIG. 6B is an image of a right eye portion which is captured in a state (FIG. 5B) where the illumination light is emitted from the second illumination unit 22. Hereinafter, the image is referred to as a "second image" and a pixel G2 which configures the second image is referred to as a "second pixel". In this state, the light is reflected from the right side of the face, and thus, most of the second pixel G2 has luminance which increases more than the first pixel G1. Accordingly, the second image is brighter than the first image over all. In addition, a portion corresponding to a reflection portion R2 (FIG. 5B) from which the illumination light is reflected from the eyeglasses becomes a remarkably bright image, as shown in white pixels.

In FIGS. 6A and 6B, X coordinates (horizontal direction) and Y coordinates (vertical direction) are respectively assigned to the first image G1 and the second image G2. In addition, luminance values of each pixel having the same coordinate value, that is, each pixel (hereinafter, referred to as "corresponding pixel") which is in the relatively same position between the pixels G1 and G2 are compared with each other, and an image which is obtained by synthesizing the pixels with low luminance becomes an image of FIG. 6C according to a method of the related art. It can be seen that, in FIG. 6C, both a high luminance portion (white pixel) according to reflection from the eyeglasses of FIG. 6A and a high luminance portion (white pixel) according to reflection from the eyeglasses of FIG. 6B have low luminance, and can be less affected by reflected light. However, on the other hand, since the synthesized image is configured by pixels with low luminance, the entire image becomes dark.

Figure 6C:
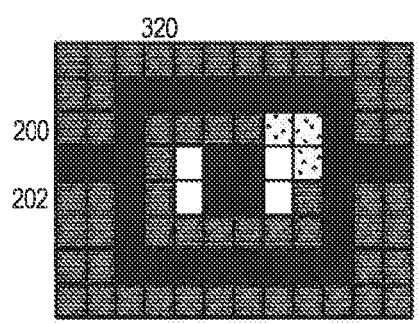
Figure 6D:
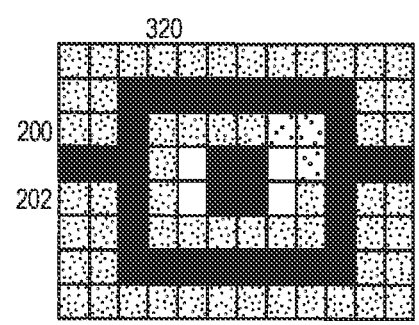

FIG. 6D illustrates a synthesized image which is obtained by correcting the image of FIG. 6C using the image correction unit 4, that is, a corrected image. In correction processing, a difference ΔQ between a luminance value Q1 of the first pixel G1 and a luminance value Q2 of the second pixel G2 is first calculated by using the following equation for each corresponding pixel of the first image of FIG. 6A and the second image of FIG. 6B.

$$\Delta Q = Q1 - Q2 \quad (1)$$

Next, an absolute value |ΔQ| of the difference ΔQ is calculated by the following equation.

$$|\Delta Q| = |Q1 - Q2| \quad (2)$$

Furthermore, a difference logarithmic value A that is a logarithm of the absolute value |ΔQ| of the difference is calculated by the following equation.

$$A = \log_2 |\Delta Q| = \log_2 |Q1 - Q2| \quad (3)$$

In addition, a luminance correcting value Qs is calculated by adding the difference logarithmic value A to a low luminance value Min(Q1,Q2) which is the smaller luminance value of the luminance values Q1 and Q2, for each corresponding pixel.

$$\begin{aligned} Qs &= \text{Min}(Q1, Q2) + A \\ &= \text{Min}(Q1, Q2) + \log_2 |Q1 - Q2| \end{aligned} \quad (4)$$

Thereby, the luminance value of each corresponding pixel of the synthesized image becomes the luminance correcting value Qs which is obtained by adding the difference logarithmic value A to a low luminance value, and thus, it is possible to obtain an overall bright image as illustrated in FIG. 6D, compared to the method of the related art of FIG. 6C in which the synthesized image is generated by using a pixel with simply low luminance. The luminance correcting value Qs corresponds to a "first luminance correcting value" according to one embodiment of the invention.

Figure 7:
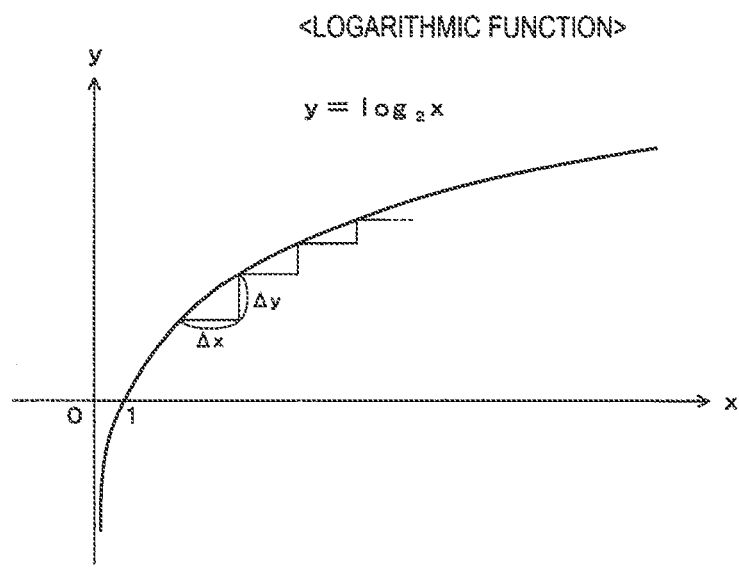
FIG. 7 is a graph representing a logarithmic function.

FIG. 7 illustrates a graph of a logarithmic function y=log₂x which is used for calculation of the difference logarithmic value A. Here, in order to simplify calculation as much as possible, a logarithmic function in which 2 becomes a base is used. As can be seen from FIG. 7, a value y of a logarithm simply increases when a variable x increases, and a rate of increase Δy/Δx gradually decreases. Hence, for example, in a case where the luminance values Q1 and Q2 of the corresponding pixels G1 and G2 are respectively Q1=19 and Q2=153, the luminance correcting value Qs is obtained by Equation (4) as follows.

$$\begin{aligned} Qs &= \text{Min}(Q1, Q2) + \log_2|Q1 - Q2| \\ &= 19 + \log_2(153 - 19) \\ &= 19 + 7.06 = 26.06 \end{aligned}$$

That is, 153−19=134 which is a difference between the luminance values Q1 and Q2 is converted into 7.06 which is a logarithm thereof, and is added to the lower luminance value 19, and the luminance correcting value Qs is calculated.

As such, in a case where a difference between the luminance values Q1 and Q2 is large, the luminance difference is significantly compressed by logarithm conversion. Hence, although the difference logarithmic value A is added to the luminance value Min(Q1,Q2), the luminance correcting value Qs does not become an unnecessarily large value. Thereby, it is possible to prevent the entire image from becoming dark and to reduce influence of the reflected light from eyeglasses.

For example, if focusing on a pixel of coordinates (320, 200) in FIGS. 6A and 6B, a luminance difference between corresponding pixels is large by being affected by reflected light from eyeglasses. In this case, as described above, as a result of compression of a large luminance difference and of calculating the luminance correcting value Qs, the pixel of coordinates (320, 200) in FIG. 6D is bright compared with the same pixel of FIG. 6C but less affected by the reflected light.

Meanwhile, for example, in a case where the luminance values Q1 and Q2 of the corresponding pixels G1 and G2 are respectively Q1=63 and Q2=71, the luminance correcting value Qs is obtained by Equation (4) as follows.

$$Qs = \text{Min}(Q1, Q2) + \log_2|Q1 - Q2|$$
$$= 63 + \log_2(71 - 63)$$
$$= 63 + 3 = 66$$

That is, 71−63=8 which is a difference between the luminance values Q1 and Q2 is converted into 3 which is a logarithm thereof, and is added to the lower luminance value 63, and the luminance correcting value Qs is calculated. As such, in a case where a difference between the luminance values Q1 and Q2 is small, a degree of compression is decreased, although the luminance difference is converted into a logarithm. Hence, the difference logarithmic value A is added to the luminance value Min(Q1,Q2), the luminance correcting value Qs in which a small difference of a luminance value is reflected is obtained.

For example, if focusing on a pixel of coordinates (320, 202) in FIGS. 6A and 6B, influence of the reflected light from the eyeglasses are less, and the luminance difference between the corresponding pixels is relatively small. In this case, as described above, as a result of calculating the luminance correcting value Qs in which the luminance difference is reflected, the pixel of coordinates (320, 202) in FIG. 6D has brightness which is obtained by adding brightness according to the luminance difference to the brightness of the same pixel of FIG. 6C.

The aforementioned correction processing is performed with respect to not only the eye portions, but also the entire face. As the result, an image (corrected image) of a face for which the correction processing is performed is brightened over all, compared with the image of FIG. 8A according to the method of the related art, as described in FIG. 8B. Accordingly, it is easy to accurately detect outline of a face image or to accurately detect a position of an eye from the face image or a state of a pupil and an eyelid, and it is possible to increase detection accuracy. Actually, luminance of each image of FIGS. 8A and 8B is not uniform over all the face, and there is a luminance difference according to a position in the face, but for the sake of convenient description herein, it is assumed that the luminance of the entire face is uniform.

Figure 9:
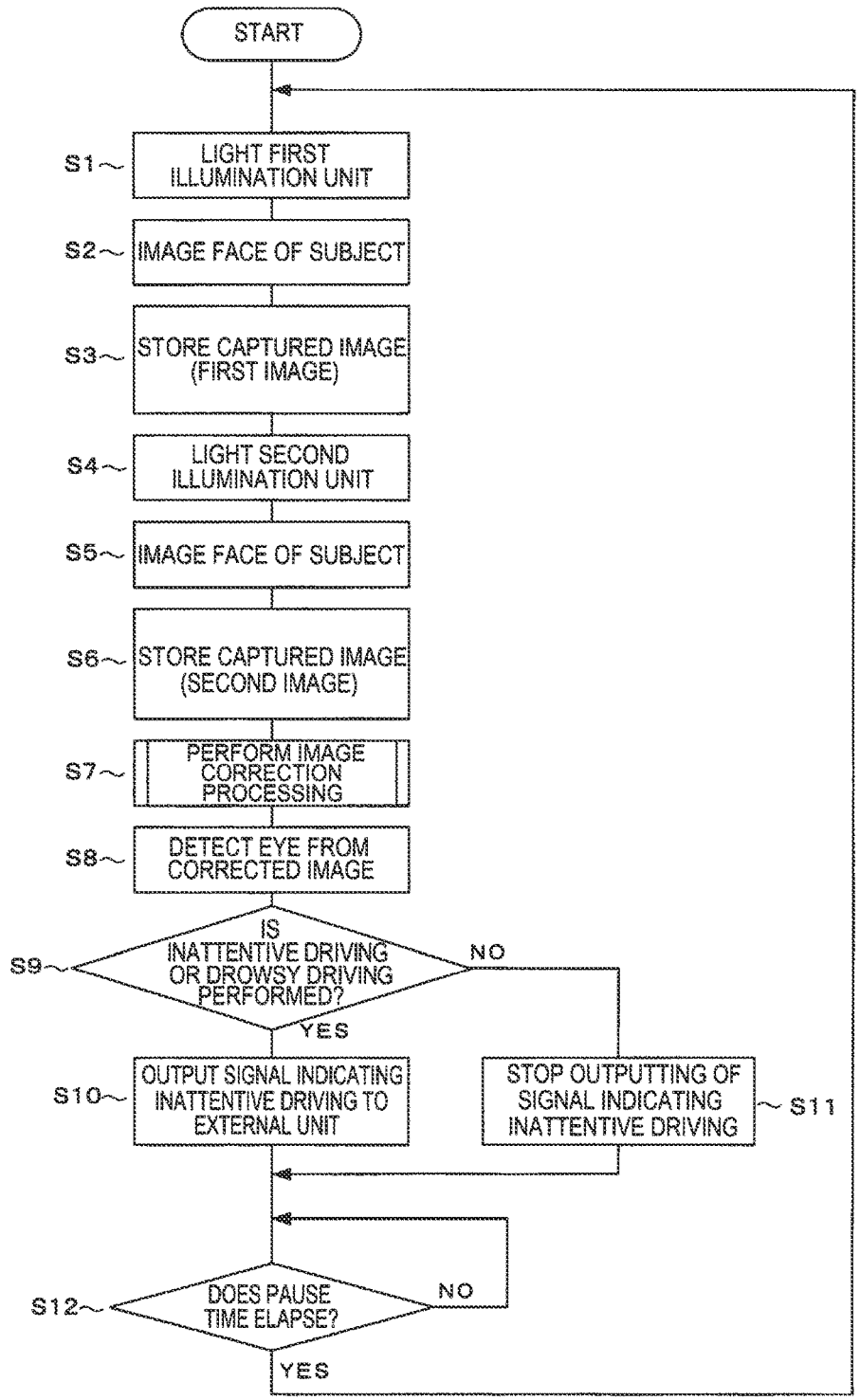
FIG. 9 is a flowchart illustrating the entire operation of the driver monitor according to the first embodiment.

FIG. 9 is a flowchart illustrating the entire operation of the driver monitor 100 according to the first embodiment.

In step S1 of FIG. 9, the first illumination unit 21 is lighted, and a face of a subject (driver P) is irradiated with illumination light as illustrated in FIG. 4A. In this state, in step S2, the face of the subject is captured by the image capturing unit 1. Then, in step S3, an image of the face which is captured is stored in the storage unit 3 as a first image. Subsequently, in step S4, the second illumination unit 22 is lighted, and the face of the subject (driver P) is irradiated with illumination light as illustrated in FIG. 4B. In this state, in step S5, the face of the subject is captured by the image capturing unit 1. Then, in step S6, an image of the face which is captured is stored in the storage unit 3 as a second image. Thereafter, in step S7, the aforementioned image correction processing is performed based on the first image and the second image. Details of step S7 are described in FIG. 10, and will be described below. A corrected image which is obtained by performing the correction processing is stored in the corrected image storage unit 5.

Subsequently, in step S8, the image analysis unit 6 reads the corrected image stored in the corrected image storage unit 5, and detects an eye from the corrected image. In detail, the image analysis unit 6 analyzes the corrected image, detects a position of the eye, and detects a direction of a line of sight of a pupil, a closing state of an eyelid, or the like. A method of detecting this is known, and is not characteristics of the invention, and thus, detailed description of the detecting method will be omitted. Subsequently, in step S9, the control unit 7 determines whether or not the driver P is doing an inattentive driving or drowsy driving from a state of the eye detected in step S8. A method of determining this is also known, and is not characteristics of the invention, and thus, detailed description of the determining method will be omitted.

As a result of determination in step S9, in a case where the driver P is doing inattentive driving or drowsy driving (step S9; Yes), the control unit 7 outputs a signal indicating that the drive is doing inattentive driving or drowsy driving to a vehicle control system which is not illustrated through the external output unit 8, in step S10. The vehicle control system performs control of such as alerting or the like, based on the signal. Meanwhile, as a result of the determination in step S9, in a case where the driver P is doing neither the inattentive driving nor drowsy driving (step S9; NO), the control unit 7 stops outputting of the signal indicating that the drive is doing inattentive driving or drowsy driving, in step S11.

After step S10 or step S11 is performed, it is determined whether or not pause time elapses in step S12. The pause time is standby time until the first illumination unit 21 emits light at next timing. As a result of determination of step S12, if the pause time does not elapse (step S12; NO), standby is continued as it is, and if the pause time elapses (step S12; Yes), the processing returns to step S1, and the aforementioned processing of steps S1 to S12 is repeated.

Figure 10:
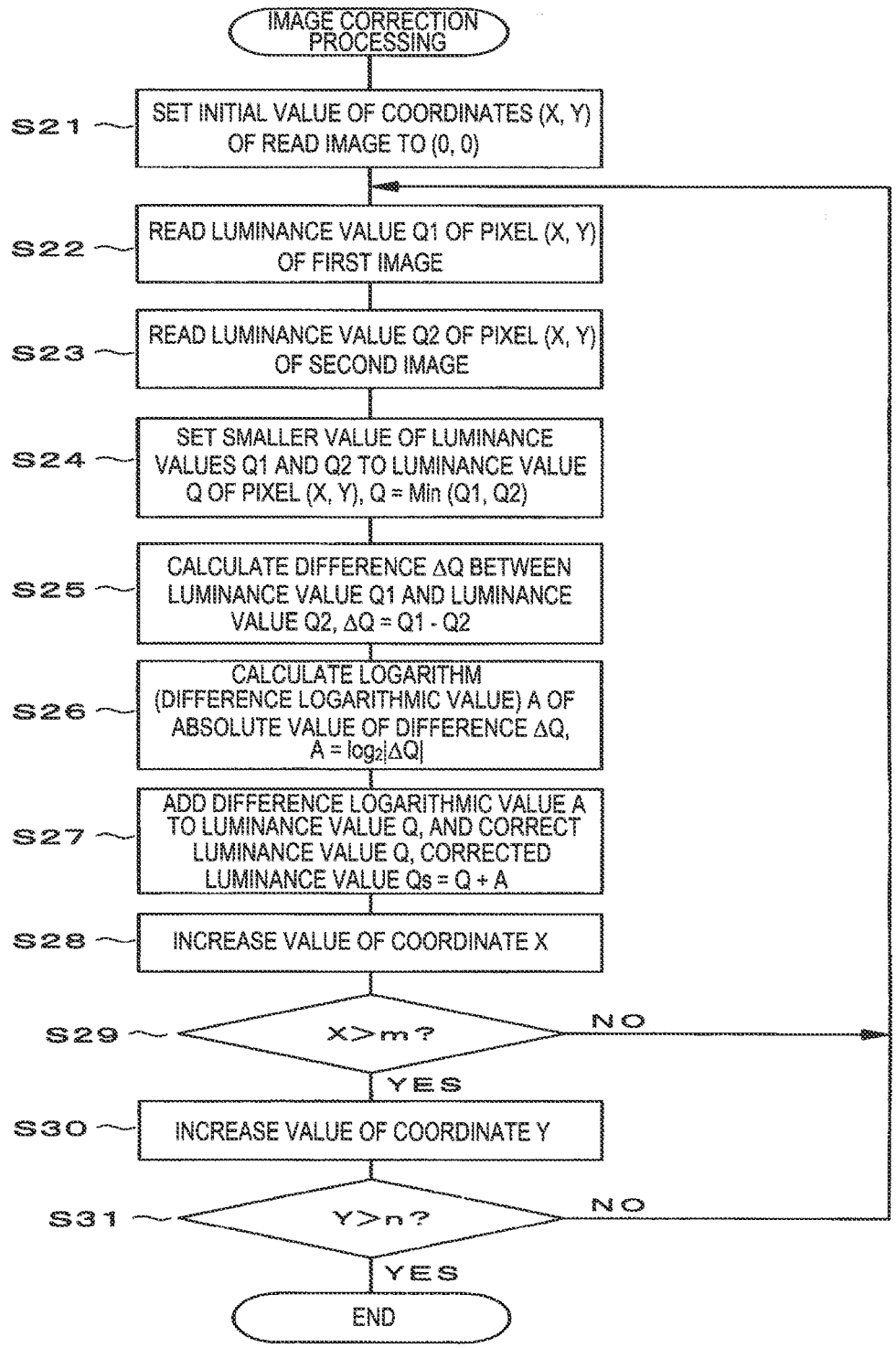
FIG. 10 is a flowchart illustrating details of step S7 of FIG. 9.

The FIG. 10 is a flowchart illustrating detailed procedures of the image correction processing of step S7 of FIG. 9. Each procedure of the present flowchart is performed by the image correction unit 4.

In step S21 in FIG. 10, an initial value of coordinates (X, Y) of a read pixel is set to (0, 0). X and Y are respectively coordinate values in a range of $0 \leq X \leq m$ and $0 \leq Y \leq n$ (m and n are integers). Hence, the total number of the pixels is $(m+1) \times (n+1)$.

Subsequently, in step S22, the luminance value Q1 of a pixel (hereinafter, referred to as a "pixel (X, Y)") of coordinates (X, Y) is read from the first image stored in step S3 of FIG. 9. When step S22 is performed at first time, the luminance value Q1 of a pixel (0, 0) of the first image is read. Subsequently, in step S23, the luminance value Q2 of a pixel (X, Y) is read from the second image stored in step S6 of FIG. 9. When step S23 is performed at first time, the luminance value Q2 of a pixel (0, 0) of the second image is read.

Thereafter, in step S24, the smaller value of the luminance value Q1 and the luminance value Q2, that is, a low luminance value Min(Q1, Q2) is set to a luminance value Q of the pixel (X, Y) (Q=Min(Q1, Q2)). Subsequently, in step S25, the difference ΔQ between the luminance value Q1 and the luminance value Q2 is calculated (ΔQ=Q1−Q2). Subsequently, in step S26, a logarithm of an absolute value of the difference ΔQ, that is, the difference logarithmic value A is calculated (A=$\log_2$|ΔQ|). Furthermore, in step S27, a luminance value Q is corrected by adding the difference logarithmic value A to the luminance value Q, and the luminance correcting value Qs is calculated (Qs=Q+A=Min(Q1, Q2)+A).

If processing which is performed up to step S27 ends, the processing proceeds to step S28, and a value of the coordinate X increases. That is, calculation of X=X+1 is performed. Then, in step S29, it is determined whether or not X>m, and if X>m is not satisfied (step S29; NO), the processing returns to step S22, and the luminance value Q1 of a next pixel of the first image is read, and hereinafter, steps S22 to S29 are repeated. In addition, if X>m is satisfied (step S29; Yes), the processing returns to S30, and a value of the coordinate Y increases. That is, calculation of Y=Y+1 is performed. Subsequently, in step S31, it is determined whether or not Y>n, and if Y>n is not satisfied (step S31; NO), the processing returns to step S22, and the luminance value Q1 of a next pixel of the first image is read, and hereinafter, steps S22 to S31 are repeated. Then, if Y>n is satisfied (step S31; Yes), it is determined that correction processing of the entire pixels is completed, a series of processing ends.

According to the aforementioned first embodiment, the synthesized image is generated by using the luminance correcting value which is obtained by adding the difference logarithmic value to the luminance value (low luminance value) of the pixel with low luminance, and thus, it is possible to reduce influence of the reflected light from the eyeglasses on the synthesized image and to obtain the synthesized image which is bright over all. In addition, in a method which uses a threshold value described in JP-A-2006-48328, an image is discontinuous as described above, and arithmetic processing is also complicated, but in the present embodiment, correction is made by using only single calculation of Equation (4) described above without using a threshold voltage, and thus, an image is not discontinuous, and arithmetic processing is also simple.

Figure 11:
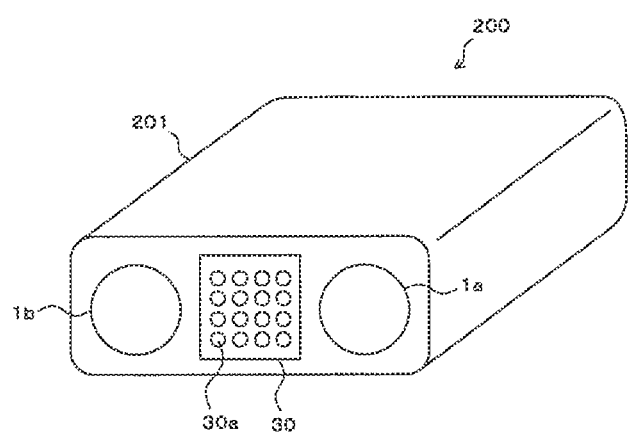
FIG. 11 is an external view of a driver monitor according to a second embodiment.

Next, a second embodiment of the invention will be described. In the aforementioned first embodiment, the driver monitor 100 includes one image capturing unit 1 which is provided in the center of the front surface of the case 101, and two illumination units 21 and 22 which are provided on both sides of the image capturing unit 1, as illustrated in FIG. 2. In contrast to this, in the second embodiment, a driver monitor 200 includes one illumination unit 30 which is provided in the center of the front surface of a case 201, and a first image capturing unit 1a and a second image capturing unit 1b which are provided on both sides of the illumination unit 30, as illustrated in FIG. 11. That is, the driver monitor 200 according to the second embodiment is a driver monitor of a stereo camera method which includes two image capturing units.

Figure 12:
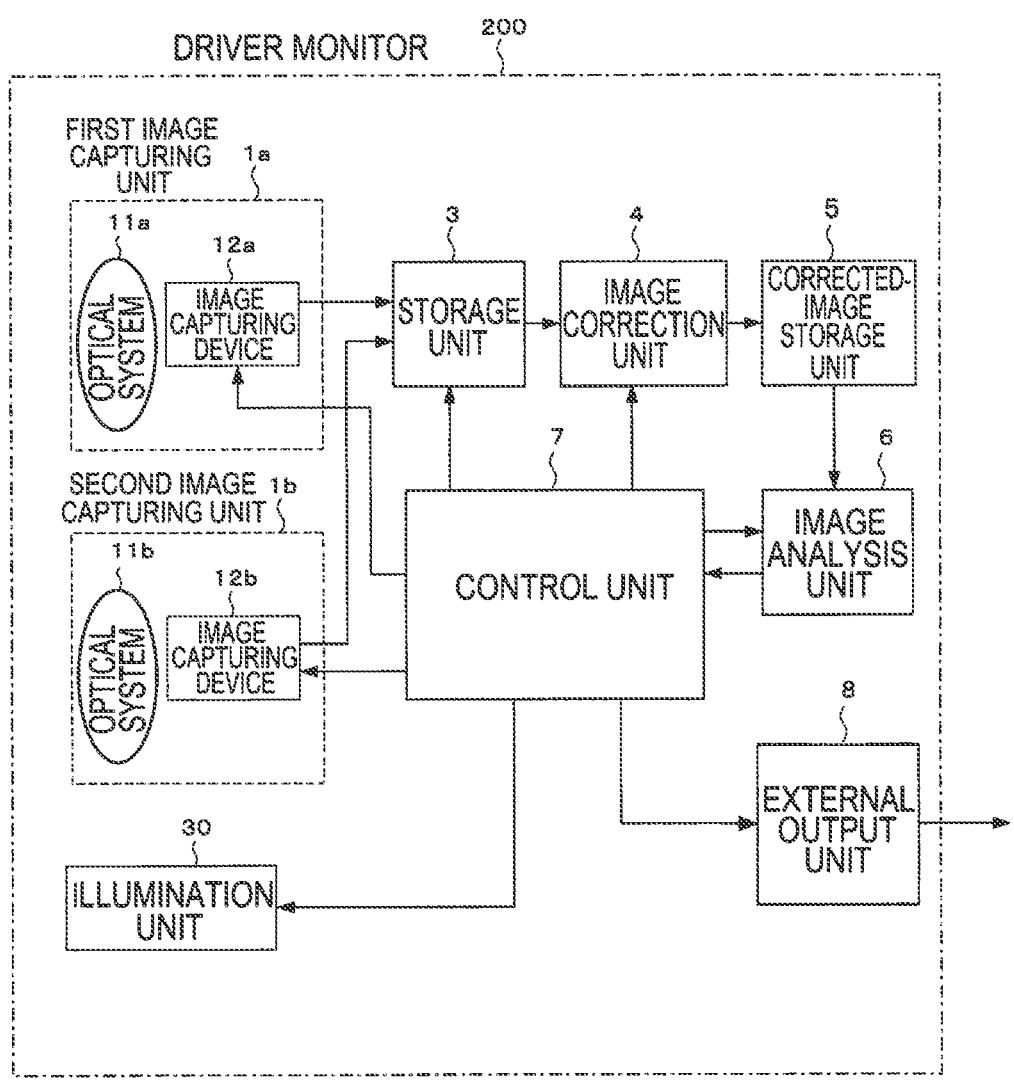
FIG. 12 is a block diagram of the driver monitor according to the second embodiment.

FIG. 12 illustrates a block diagram of the driver monitor 200 according to the second embodiment. The first image capturing unit 1a is configured with an optical system 11a including lenses, an optical filter, and the like, and an image capturing device 12a which captures images of a subject (driver) through the optical system 11a. The second image capturing unit 1b is configured with an optical system 11b including lenses, an optical filter, and the like, and an image capturing device 12b which captures images of a subject (driver) through the optical system 11b, and captures images of the subject in a direction different from the first image capturing unit 1a.

Each of the image capturing devices 12a and 12b includes multiple image capturing elements (not illustrated) which are arranged in a lattice shape. Each image capturing element is configured with, for example, a charge coupled device (CCD). The illumination unit 30 includes multiple light emitting elements 30a which are arranged in a lattice shape, as illustrated in FIG. 11. Each of the light emitting elements 30a is configured with, for example, a light emitting diode (LED) which emits near-infrared light.

Other units 3 to 8 of FIG. 12 are the same as in FIG. 1, and thus, repeated description thereof will be omitted. The driver monitor 200 according to the second embodiment is provided at a driver's seat of a vehicle in the same manner as the driver monitor 100 according to the first embodiment illustrated in FIG. 3.

Figure 13:
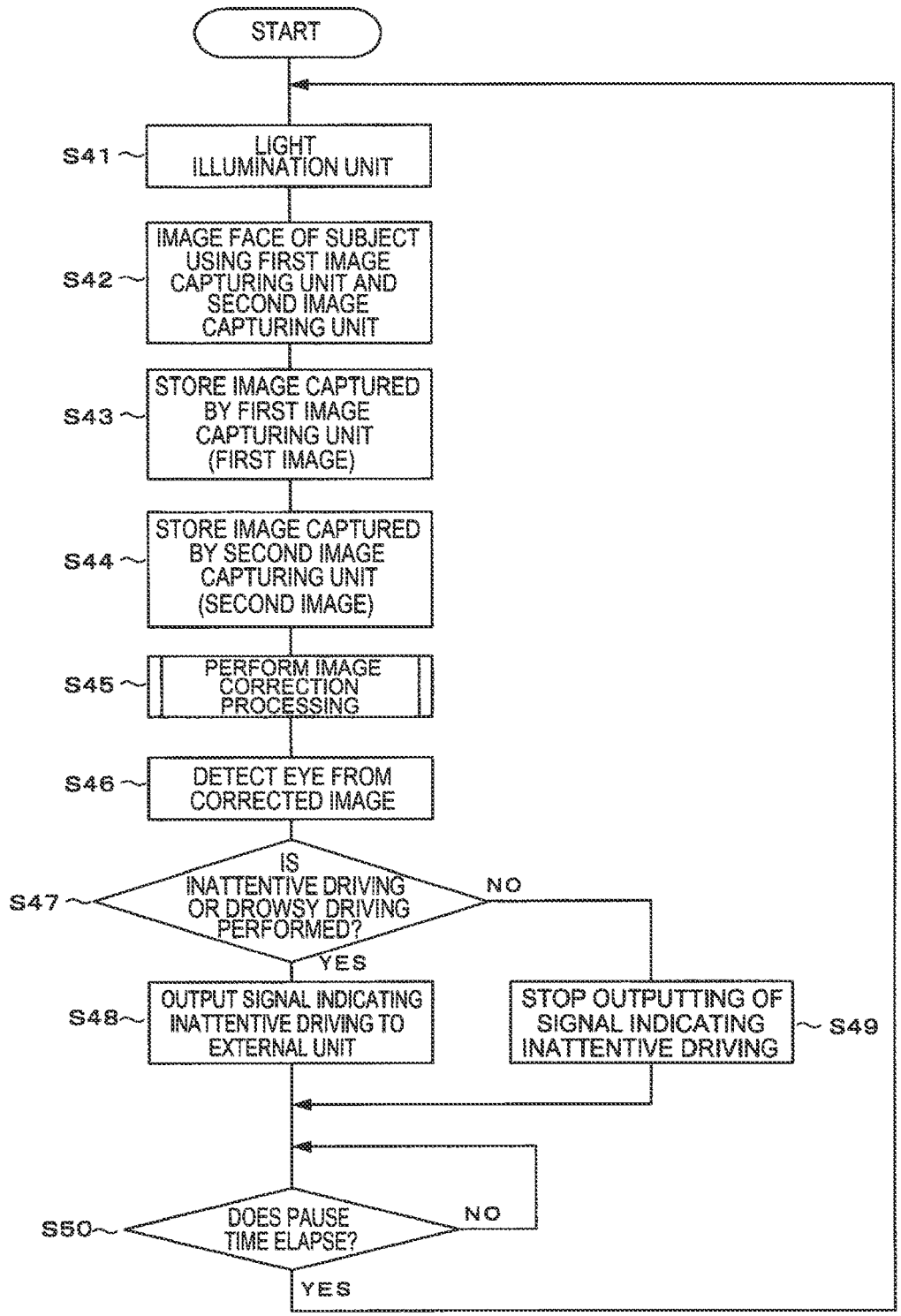
FIG. 13 is a flowchart illustrating the entire operation of the driver monitor according to the second embodiment.

FIG. 13 is a flowchart illustrating the entire operation of the driver monitor 200 according to the second embodiment.

In step S41 of FIG. 13, the illumination unit 30 is lighted, and a face of a subject (driver P) is irradiated with illumination light. In this state, in step S42, the face of the subject is simultaneously captured by the first image capturing unit 1a and the second image capturing unit 1b in a direction different from each other. Then, in step S43, an image of the face which is captured by the first image capturing unit 1a is stored in the storage unit 3 as a first image, and in step S44, an image of the face which is captured by the second image capturing unit 1b is stored in the storage unit 3 as a second image. Thereafter, in step S45, an image correction processing is performed based on the first image and the second image. Details of step S45 are described in FIG. 14, and will be described below. A corrected image which is obtained by performing the correction processing is stored in the corrected image storage unit 5.

Processing of subsequent steps S46 to S50 is the same as the processing of steps S8 to S12 of FIG. 9. That is, in step S46, the image analysis unit 6 detects a position of an eye, a direction of a line of sight of a pupil, a closing state of an eyelid, or the like from the corrected image in the corrected image storage unit 5. In step S47, the control unit 7 determines presence or absence of inattentive driving or the like. In a case where there is inattentive driving or the like (step S47; Yes), the control unit 7 outputs a signal indicating the inattentive driving or the like to a vehicle control system through the external output unit 8, in step S48. Meanwhile, in a case where there is no inattentive driving or the like (step S47; NO), the control unit 7 stops outputting of the signal indicating the inattentive driving or the like, in step S49. Then, the processing waits elapse of pause time (step S50), and returns to step S41, and processing of the aforementioned steps S41 to S50 is repeated.

Figure 14:
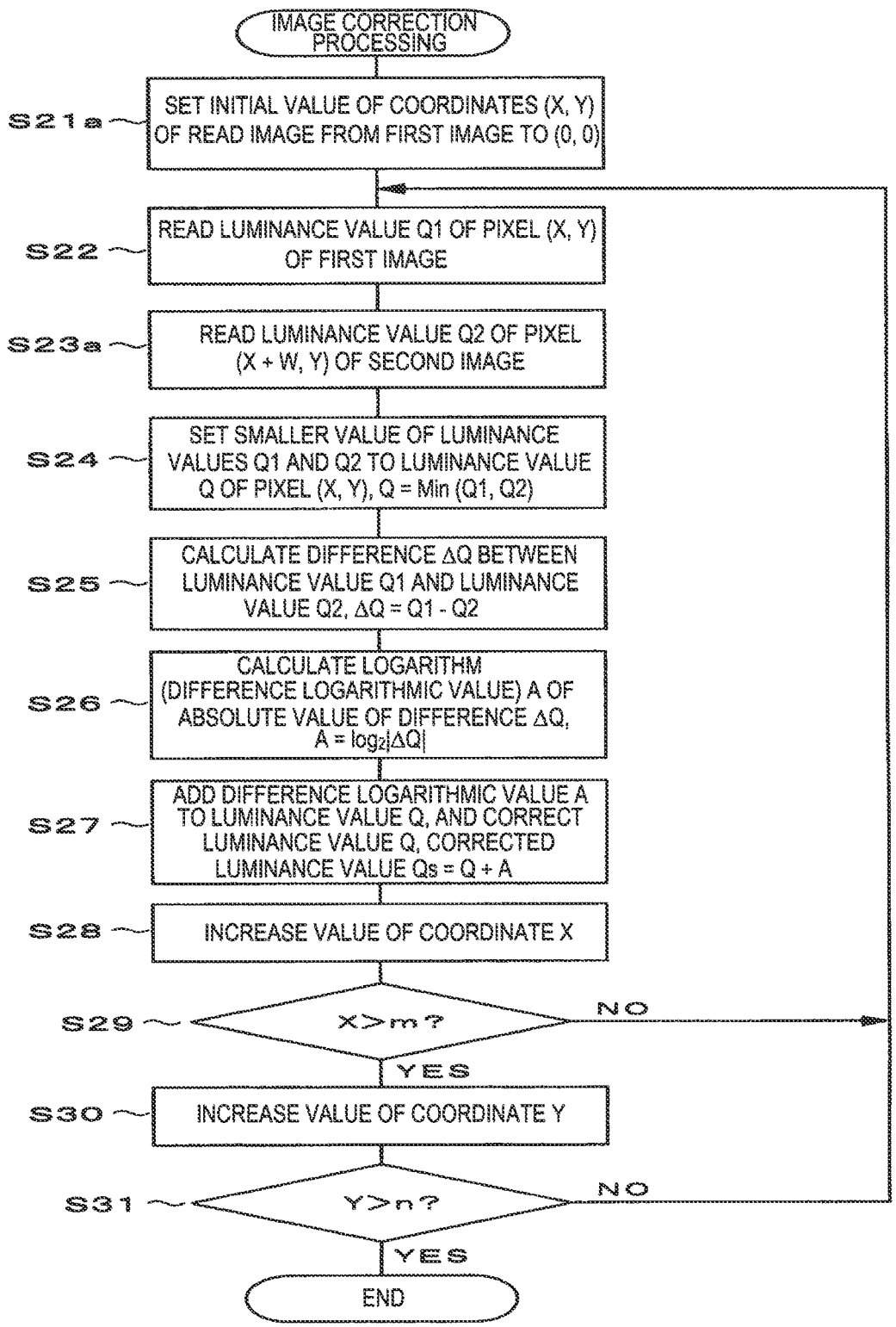
FIG. 14 is a flowchart illustrating details of step S45 of FIG. 13.

FIG. 14 is a flowchart illustrating detailed procedures of the image correction processing of step S45 of FIG. 13. Each procedure of the present flowchart is performed by the image correction unit 4. In each step of FIG. 14, the same symbols or reference numerals are attached to steps which perform the same processing as in FIG. 10. In FIG. 14, the step S21 of FIG. 10 is replaced with step S21a, and the step S23 of FIG. 10 is replaced with step S23a.

In step S21a in FIG. 14, an initial value of coordinates (X, Y) of a read pixel is set to (0, 0) in the first image. X and Y are respectively coordinate values in a range of 0≤X≤m and 0≤Y≤n (m and n are integers). Hence, the total number of the pixels is (m+1)×(n+1).

Subsequently, in step S22, the luminance value Q1 of a pixel (hereinafter, referred to as a "pixel (X, Y)") of coordinates (X, Y) is read from the first image stored in step S43 of FIG. 13. When step S22 is performed at first time, the luminance value Q1 of a pixel (0, 0) of the first image is read.

Subsequently, in step S23a, the luminance value Q2 of a pixel (X+W, Y) is read from the second image stored in step S44 of FIG. 13. When step S23a is performed at first time, the luminance value Q2 of a pixel (W, 0) of the second image is read. Here, W is a value which correlates a pixel of the first image capturing unit 1a and a pixel of the second image capturing unit 1b, and which corresponds to parallax. This will be described in more detail in FIG. 15.

Figure 15:
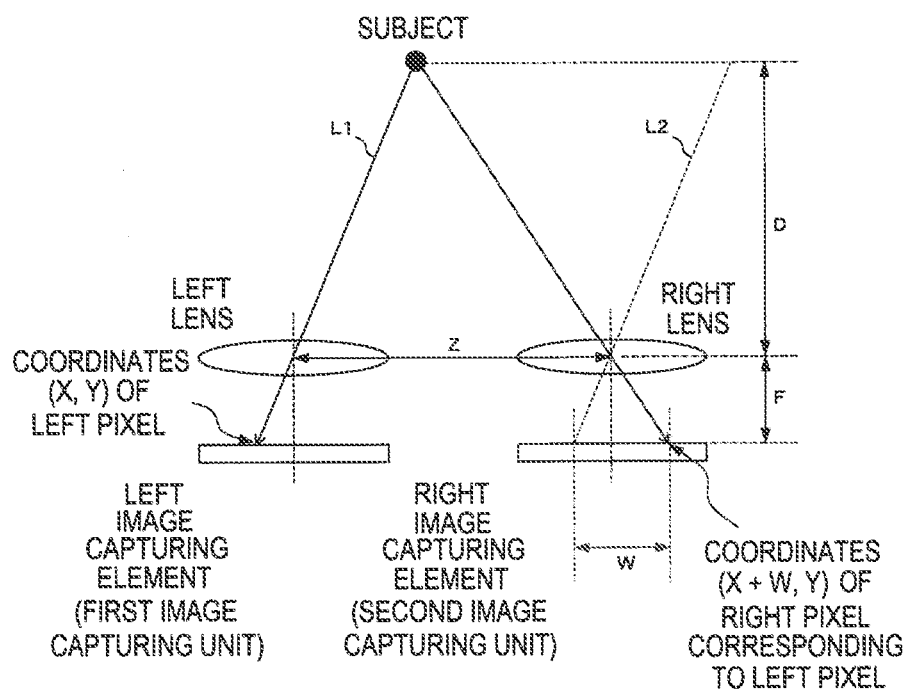
FIG. 15 is a diagram illustrating a method of geometrically correlating right and left pixels.

FIG. 15 illustrates a geometrical relationship between a left pixel and a right pixel according to a stereo camera method. A left image capturing element is included in the image capturing device 12a of the first image capturing unit 1a, and a right image capturing element is included in the image capturing device 12b of the second image capturing unit 1b. D is a distance between a subject and a camera (image capturing devices 12a and 12b). The subject is a driver who sits at a seat, the camera is fixed to a vehicle body, and thus, the distance D can be regarded as an approximately constant value. F is a focal length, and Z is a distance between cameras, and these are known values. Two straight lines L1 and L2 are parallel to each other.

In FIG. 15, a value of a coordinate X of a pixel of the right image capturing element corresponding to a pixel of the left image capturing element is shifted more than the value of the coordinate X of the pixel of the left image capturing element by W. Hence, when coordinates of a certain pixel of the left image capturing element are set to (X, Y), coordinates of a pixel of the right image capturing element corresponding thereto are set to (X+W, Y). Here, since a geometrical relationship of W/F=Z/D is satisfied, W in step S23a of FIG. 14 can be calculated by the following equation.

$$W = F \cdot (Z/D) \quad (5)$$

Processing of steps S24 to S31 of FIG. 14 is the same as a case of FIG. 10. That is, in step S24, the smaller value of the luminance value Q1 and the luminance value Q2 is set to the luminance value Q of the pixel (X, Y), and in step S25, the difference $\Delta Q$ between the luminance value Q1 and the luminance value Q2 is calculated, and in step S26, the difference logarithmic value A that is a logarithm of an absolute value of the difference $\Delta Q$ is calculated. Then, in step S27, the luminance value Q is corrected by adding the difference logarithmic value A to the luminance value Q, and the luminance correcting value Qs is calculated. Thereafter, in step S28, a value of the coordinate X increases, and in step S29, if X>m is not satisfied, the processing returns to step S22, and if X>m is satisfied, the processing proceeds to step S30, and a value of the coordinate Y increases. Then, in step S31, if Y>n is not satisfied, the processing returns to step S22, and if Y>n is satisfied, a series of processing ends.

Also in the second embodiment described above, the luminance value is corrected by adding the difference logarithmic value to the smaller luminance value (low luminance value) for each corresponding pixel, and thus, it is possible to obtain the same effects as in the first embodiment. Furthermore, since one illumination unit 30 is used in the second embodiment, there is no necessity for two illumination units 21 and 22 to emit light at different timing as in the first embodiment and control of the illumination unit 30 becomes simple. In addition, the first image and the second image can be obtained by the two image capturing units 1a and 1b all at once at the same timing, and thus, there is an advantage that a frame rate (the number of processed images per unit time) increases, compared with a case where the first image and the second image are obtained by one image capturing unit 1 at different timing as in the first embodiment.

Figure 16:
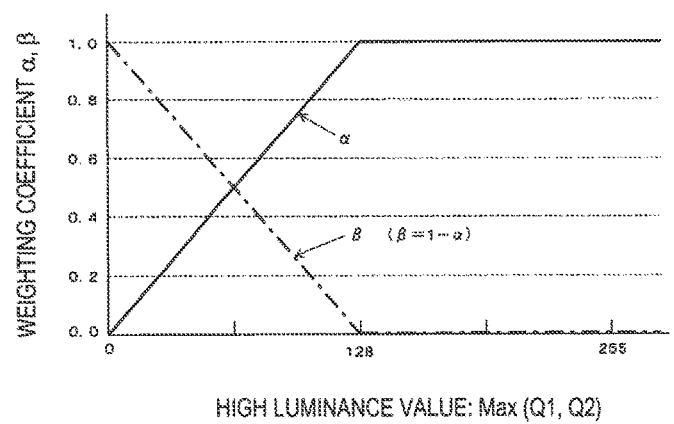
FIG. 16 is a graph illustrating weighting coefficients.

Next, another method of calculating a luminance correcting value will be described with reference to FIG. 16. FIG. 16 is a graph illustrating weighting coefficients which are used for calculating the luminance correcting value. A horizontal axis denotes a number which denotes a high luminance value Max (Q1, Q2) that are the larger luminance value of the luminance values Q1 and Q2 of two pixels corresponding to the first image and the second image, as a gradation. Here, the darkest state to the brightest state of a pixel are denoted by luminance values of 256 gradations (0 to 255). A vertical axis denotes weighting coefficients which change according to the high luminance value Max (Q1, Q2). Here, two coefficients $\alpha$ and $\beta$ are used as the weighting coefficients.

The coefficient $\alpha$ changes in a range of $0 \le \alpha \le 1$ according to the high luminance value Max (Q1, Q2), and if Max (Q1, Q2) is greater than 128, $\alpha=1$, and as Max (Q1, Q2) is less than 128, $\alpha$ gradually decreases, and $\alpha=0$ when Max (Q1, Q2) is zero. The coefficient $\alpha$ corresponds to a "first coefficient" according to one embodiment of the invention. In addition, the coefficient $\beta$ is satisfied by $\beta = 1-\alpha$, and changes in a range of $0 \le \beta \le 1$ according to the high luminance value Max (Q1, Q2). If Max (Q1, Q2) is greater than or equal to 128, $\beta=0$, and as Max (Q1, Q2) is less than 128, $\beta$ gradually increases, and $\beta=1$ when Max (Q1, Q2) is zero. The coefficient $\beta$ corresponds to a "second coefficient" according to one embodiment of the invention.

The image correction unit 4 detects the first luminance value Q1 and the second luminance value Q2 of each pixel corresponding to the first image and the second image, and compares the first luminance value Q1 and the second luminance value Q2, and detects the high luminance values Max (Q1, Q2) of the larger luminance value and the low luminance values Min (Q1, Q2) of the smaller luminance value. In addition, the difference logarithmic value A (aforementioned) between the first luminance value Q1 and the second luminance value Q2, and a luminance average value B that is an average value of the first luminance value Q1 and the second luminance value Q2 are respectively calculated by the following equations.

Difference logarithmic value $A = \log_2 |Q1 - Q2|$

Luminance average value $B = (Q1 + Q2)/2$

Furthermore, values of the coefficients $\alpha$ and $\beta$ are determined by the graph of FIG. 16, based on the high luminance values Max (Q1, Q2). Then, a luminance correcting value Qs' is calculated by the following equations using the difference logarithmic value A, the luminance average value B, the low luminance values Min (Q1, Q2), and the coefficients $\alpha$ and $\beta$ thereof.

$$\begin{aligned} \text{Luminance correcting value } Qs' &= \alpha \cdot (\text{Min}(Q1, Q2) + A) + \beta \cdot B \quad (6) \\ &= \alpha \cdot (\text{Min}(Q1, Q2) + \\ &\quad \log_2|Q1 - Q2|) + \beta(Q1 + Q2)/2 \end{aligned}$$

As can be seen from Equation (6), the coefficient $\alpha$ is used for weighting a sum of the low luminance values Min (Q1, Q2) and the difference logarithmic value A, and the coefficient $\beta$ is used for weighting the luminance average value B. In addition, the luminance correcting value Qs' corresponds to a "second luminance correcting value" according to one embodiment of the invention.

The image correction unit 4 determines whether or not the high luminance values Max (Q1, Q2) is larger than a predetermined value (here, 128), when calculating the luminance correcting value Qs'. Then, if 0<Max(Q1, Q2)<128, values of the coefficients α and β according to the high luminance values Max (Q1, Q2) are determined from the graph of FIG. 16, the luminance correcting value Qs' is calculated by Equation (6). In addition, in a case where 128≤Max(Q1, Q2), α=1 and β=0 in Equation (6), and thereby the luminance correcting value Qs' is calculated. At this time, the luminance correcting value Qs' is calculated by the following equation, and is the same as the luminance correcting value Qs of Equation (4).

$$Qs'=\text{Min}(Q1,Q2)+\log_2|Q1-Q2| \quad (7)$$

In addition, in a case where Max (Q1, Q2)=0, α=0 and β=1 in Equation (6), and thereby the luminance correcting value Qs' is calculated. At this time, the luminance correcting value Qs' is calculated by the following equation, and the luminance average value B becomes the luminance correcting value Qs' as it is.

$$Qs'=(Q1+Q2)/2 \quad (8)$$

Figure 17A:
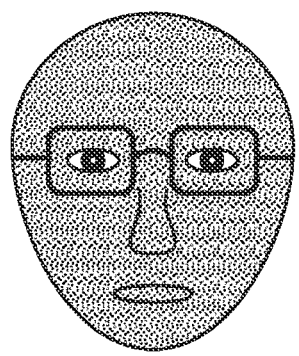
FIGS. 17A and 17B are views illustrating face images in a case where there is eyeglass reflection and a case where there is no eyeglass reflection.
Figure 17B:
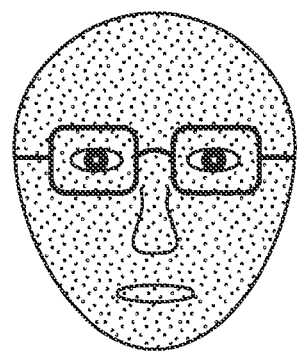

As such, correction processing of an image is performed by using the luminance correcting value Qs' which is obtained by weighting a sum of the low luminance values Min (Q1, Q2) and the difference logarithmic value A by using α, and by weighting the luminance average value B by using β, and thereby an optimal synthesized image can be formed according to presence or absence of reflection from eyeglasses. That is, in a case where light is reflected from the eyeglasses and the high luminance values Max (Q1, Q2) are large, the luminance correcting value Qs' becomes a value in which the low luminance values Min (Q1, Q2) and the difference logarithmic value A are emphasized more than the luminance average value B, as a result of being weighted by the coefficient α of the larger value and the coefficient β of the smaller value. Accordingly, it is possible to obtain a synthesized image in which compression effects of a difference that is obtained by low luminance and logarithm conversion are reflected, and which is not affected by reflected light from the eyeglasses as illustrated in FIG. 17A. Meanwhile, in a case where there is no reflected light from the eyeglasses and the high luminance values Max (Q1, Q2) is small, the luminance correcting value Qs' becomes a value in which the luminance average value B is emphasized more than the low luminance values Min (Q1, Q2) and the difference logarithmic value A, as a result of being weighted by the coefficient α of the smaller value and the coefficient β of the larger value. Accordingly, it is possible to obtain a synthesized image which is brighter than the image of FIG. 17A over all by averaging the luminance, as illustrated in FIG. 17B.

The method of forming a synthesized image using the luminance correcting value Qs' described above can also be employed in both the driver monitor 100 illustrated in FIG. 1 and FIG. 2 and the driver monitor 200 illustrated in FIG. 11 and FIG. 12.

According to one embodiment of the invention, the following various embodiments can be employed in addition to the aforementioned embodiments.

Figure 18:
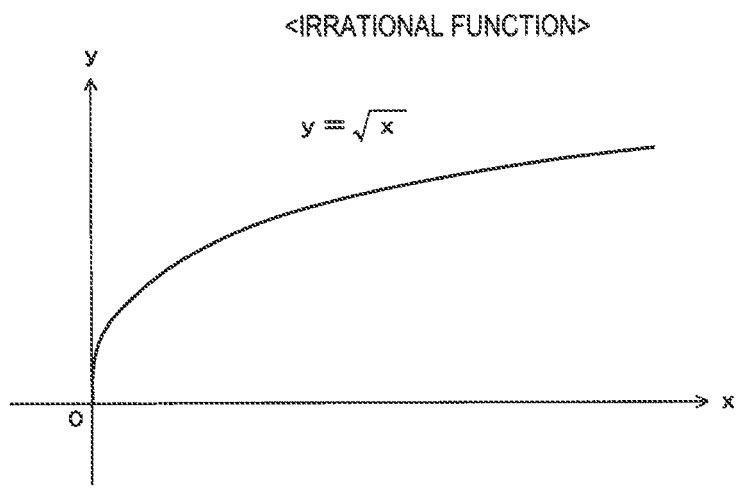
FIG. 18 is a graph representing an irrational function.
Figure 19:
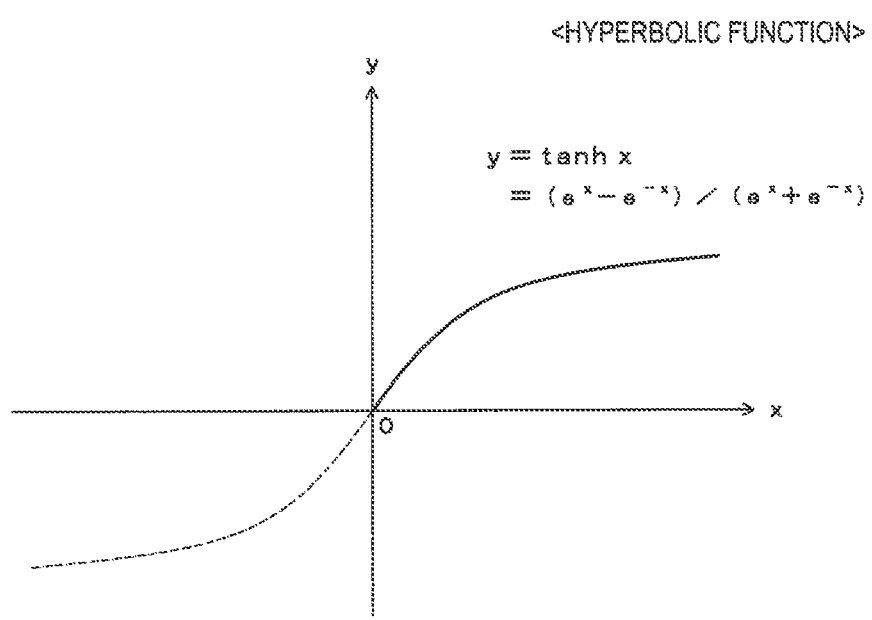
FIG. 19 is graph representing a hyperbolic function.

The aforementioned embodiment uses a logarithmic function (FIG. 7) with a base of 2 when calculating a luminance correcting value, but the base of the logarithm may be a value other than 2 (for example, 3). In addition, a function which is used for one embodiment of the invention may monotonically increase together with an increase of a logarithm, and may have an increase rate that gradually decreases, and is not limited to the logarithmic function. For example, an irrational function illustrated in FIG. 18 or a hyperbolic function illustrated in FIG. 19 can also be used.

Figure 20:
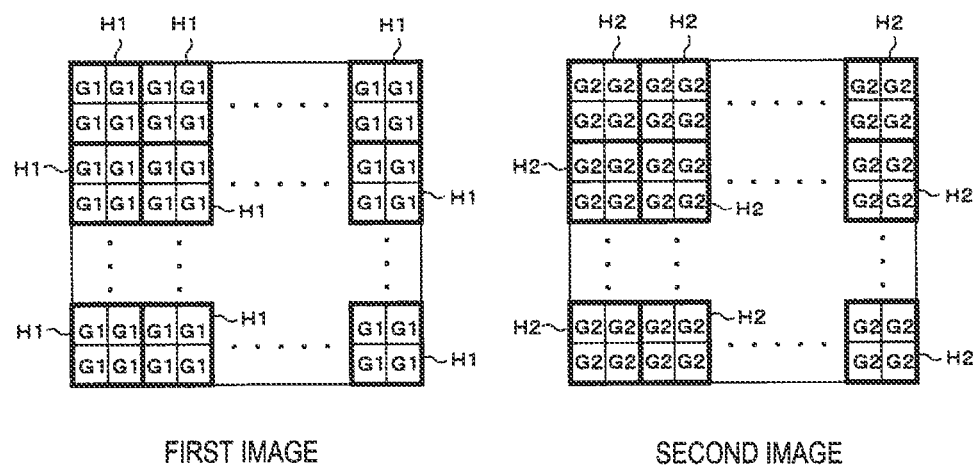
FIG. 20 is a diagram illustrating an example which compares luminance values for each block.

In the aforementioned embodiment, the first luminance value Q1 and the second luminance value Q2 are compared for each pixels corresponding to thereto, but instead of this, the luminance values may be compared with each other by a unit of a block including a plurality of pixels. For example, as illustrated in FIG. 20, the first image is divided into a plurality of first blocks H1, each block including a plurality of first pixels G1, and the second image is divided into a plurality of second blocks H2, each block including a plurality of second pixels G2. Then, the first luminance value Q1 of the first block H1 is compared with the second luminance value Q2 of the second block H2 for each block corresponding to thereto. In this case, a total value, an average value, a maximum value, or the like of a luminance value of each pixel which is included in one block can be used as the luminance values Q1 and Q2 of each of the blocks H1 and H2.

In FIG. 15, the coordinates of the pixels of the right image capturing element are calculated by using an coordinate system of the pixels of the left image capturing element as a reference, but in contrast to this, the coordinates of the pixels of the left image capturing element may be calculated by using an coordinate system of the pixels of the right image capturing element as a reference. In addition, a third coordinate system is set in addition to the coordinate system of the left and right pixels, and coordinates of the pixels of the right and left image capturing elements may be calculated by using the third coordinate system as a reference.

In addition, correlation of the pixels may be performed by an experimental method, regardless of the geometrical method illustrated in FIG. 15. For example, a figure in which a predetermined form is drawn in advance may be captured by two image capturing devices (stereo camera) in different directions, and correlation of the pixels by comparing the right pixels with the left pixels may be performed, and a table may be generated by using the results. In addition to this, various known methods such as a method of using an epipolar line can be employed as the method of correlating the pixels according to the stereo camera method.

In FIG. 16, an example in which the coefficient β of weighting is satisfied by β=1−α is used, but the coefficient β may not depend on the coefficient α.

An example in which the driver monitor 100 including one image capturing unit 1 and two illumination units 21 and 22 is used in FIG. 1 and FIG. 2, and an example in which the driver monitor 200 including two image capturing units 1a and 1b and one illumination unit 30 is used in FIG. 11 and FIG. 12, but the invention is not limited to this. For example, the driver monitor may include two image capturing units and two illumination units.

In FIG. 1 and FIG. 12, the image correction unit 4 and the image analysis unit 6 are provided separately from the control unit 7, but the image correction unit 4 and the image analysis unit 6 may be included in the control unit 7.

An example in which the driver monitor mounted in a vehicle is used as an image processing device in the aforementioned embodiment, but one embodiment of the invention can also be employed in an image processing device which is used for other applications.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. An image processing device comprising:
    a first illumination unit that emits illumination light to a subject;
    a second illumination unit that emits illumination light to the subject in a direction different from the first illumination unit;
    an image capturing unit that captures a first image of the subject in a state where the first illumination unit emits the illumination light to the subject, and captures a second image of the subject in a state where the second illumination unit emits the illumination light to the subject; and
    a processor that compares a first luminance value of a first pixel configuring the first image with a second luminance value of a second pixel configuring the second image for each corresponding pixel, and generates a corrected image by performing predetermined correction processing to a synthesized image of the first image and the second image based on the comparison results,
    wherein the processor calculates a difference between the first luminance value and the second luminance value, and calculates a luminance correcting value based on the difference and a predetermined function which monotonically increases together with an increase of the difference and whose increase rate gradually decreases, and generates the corrected image using the luminance correcting value,
    wherein the predetermined function is a logarithmic function, and
    wherein the processor calculates a difference logarithmic value that is a logarithm of an absolute value of the difference based on the logarithmic function, and calculates the luminance correcting value using the difference logarithmic value.

2. The image processing device according to claim 1, wherein the luminance correcting value is a first luminance correcting value obtained by adding a low luminance value, which is a smaller luminance value of the first luminance value and the second luminance value, to the difference logarithmic value.

3. The image processing device according to claim 1, wherein the luminance correcting value is a second luminance correcting value obtained by adding a value, which is obtained by multiplying a value obtained by adding the low luminance value that is a smaller luminance value of the first luminance value and the second luminance value to the difference logarithmic value by a first coefficient $\alpha$, to a value obtained by multiplying an average value of the first luminance value and the second luminance value by a second coefficient $\beta$.

4. The image processing device according to claim 3, wherein the first coefficient $\alpha$ changes in a range of $0 \leq \alpha \leq 1$ according to a high luminance value that is a larger luminance value of the first luminance value and the second luminance value, and gradually decreases as the high luminance value decreases, wherein the second coefficient $\beta$ satisfies $\beta=1-\alpha$ ($0 \leq \beta \leq 1$), and gradually increases as the high luminance value decreases, wherein the processor detects the high luminance value and determines whether the high luminance value is larger than or equal to a predetermined value; sets the first coefficient $\alpha$ to 1 and sets the second coefficient $\beta$ to 0, and calculates the second luminance correcting value, in a case where the high luminance value is larger than or equal to a predetermined value; and calculates the second luminance correcting value by using the first coefficient $\alpha$ ($0 \leq \alpha < 1$) and the second coefficient $\beta$ ($0 < \beta < 1$) according to the high luminance value, in a case where the high luminance value is smaller than the predetermined value.

5. The image processing device according to claim 1, wherein the logarithmic function uses 2 as a base.

6. The image processing device according to claim 1, wherein the processor compares first luminance values of a plurality of first blocks, each of which comprises a plurality of first pixels, with second luminance values of a plurality of second blocks, each of which comprises a plurality of second pixels, for each corresponding block, instead of comparing the first luminance value with the second luminance value for each corresponding pixel.

7. An image processing device comprising:
    an illumination unit that emits illumination light to a subject;
    a first image capturing unit that captures a first image of the subject in a state where the illumination unit emits the illumination light to the subject;
    a second image capturing unit that captures a second image of the subject in a direction different from the first image capturing unit in a state where the illumination unit emits the illumination light to the subject; and
    a processor that compares a first luminance value of a first pixel configuring the first image with a second luminance value of a second pixel configuring the second image for each corresponding pixel, and generates a corrected image by performing predetermined correction processing to a synthesized image of the first image and the second image, based on the comparison results,
    wherein the processor calculates a difference between the first luminance value and the second luminance value, and calculates a luminance correcting value based on the difference and a predetermined function which monotonically increases together with an increase of the difference and whose increase rate gradually decreases, and generates the corrected image using the luminance correcting value,
    wherein the predetermined function is a logarithmic function, and
    wherein the a processor calculates a difference logarithmic value that is a logarithm of an absolute value of the difference based on the logarithmic function, and calculates the luminance correcting value using the difference logarithmic value.

* * * * *